United States Patent [19] [11] 4,056,417
League, IV [45] Nov. 1, 1977

[54] OPEN LOOP HEATING CONTROLLER AND METHOD FOR CORRUGATORS

[75] Inventor: John S. League, IV, Baltimore, Md.

[73] Assignee: Koppers Company, Inc., Pittsburgh, Pa.

[21] Appl. No.: 608,980

[22] Filed: Aug. 29, 1975

[51] Int. Cl.[2] .......... B32B 31/00
[52] U.S. Cl. .......... 156/64; 156/205; 156/361; 156/367; 156/470
[58] Field of Search .......... 156/64, 205, 210, 359, 156/361, 367, 462, 472

[56] References Cited

U.S. PATENT DOCUMENTS

| | | | |
|---|---|---|---|
| 2,941,573 | 6/1960 | Cassady | 156/60 |
| 3,004,880 | 10/1961 | Lord | 156/210 |
| 3,411,388 | 11/1968 | Rappaport | 156/64 |
| 3,516,617 | 6/1970 | Haner et al. | 156/361 |
| 3,966,518 | 6/1976 | Ferara et al. | 156/205 X |
| 3,977,929 | 8/1976 | Evans | 156/205 X |
| 3,981,758 | 9/1976 | Thayer | 156/64 |

*Primary Examiner*—David A. Simmons
*Attorney, Agent, or Firm*—Herbert J. Zeh, Jr.; Oscar B. Brumback

[57] ABSTRACT

An open-loop method and apparatus for controlling the heating of webs utilized in a corrugating machine for the production of double-face corrugated paperboard as a function of at least one production factor of the corrugator machine. A rotatably journaled heating roll receives a web in contact with a circumferential area of the roll and the circumferential area of contact between the web and the roll is varied by a control circuit. The control circuit varies the contact area by positioning a positionable means relative to the heating roll in response to at least one production factor of the corrugating machine. The control circuit senses the at least one production factor of the machine and generates a signal related to the sensed production factor. The generated production factor related signal is periodically sampled and is stored at a first time. The stored production factor related signal is compared with the production factor related signal sampled at a time subsequent to the first time and a drive signal related in value to a difference between the compared signals is generated and applied to drive means for driving the positionable means.

14 Claims, 9 Drawing Figures

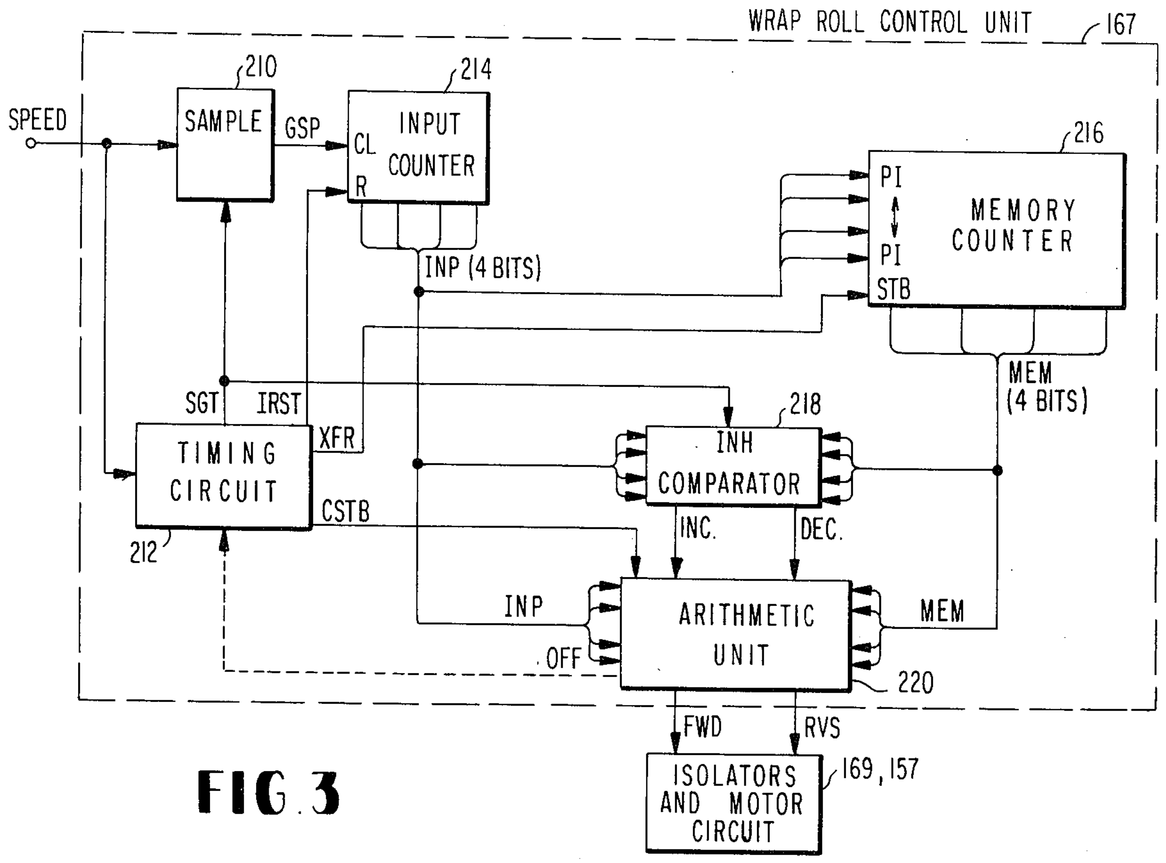
FIG. 3
FIG. 5
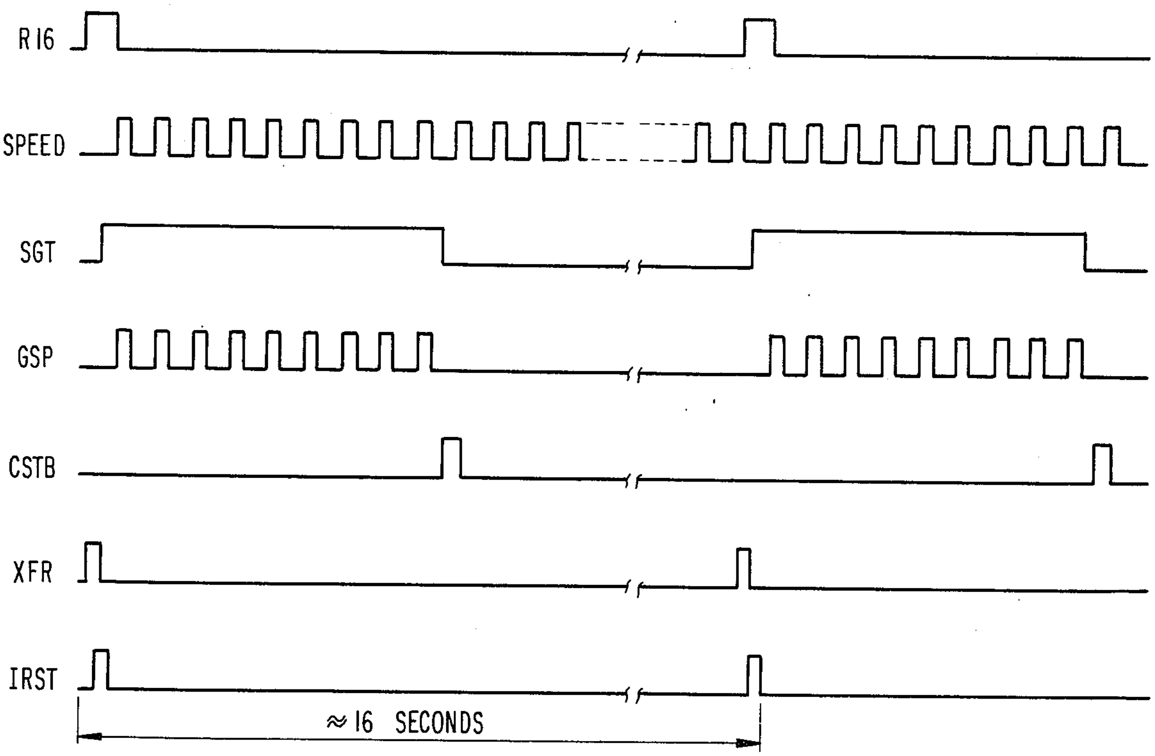

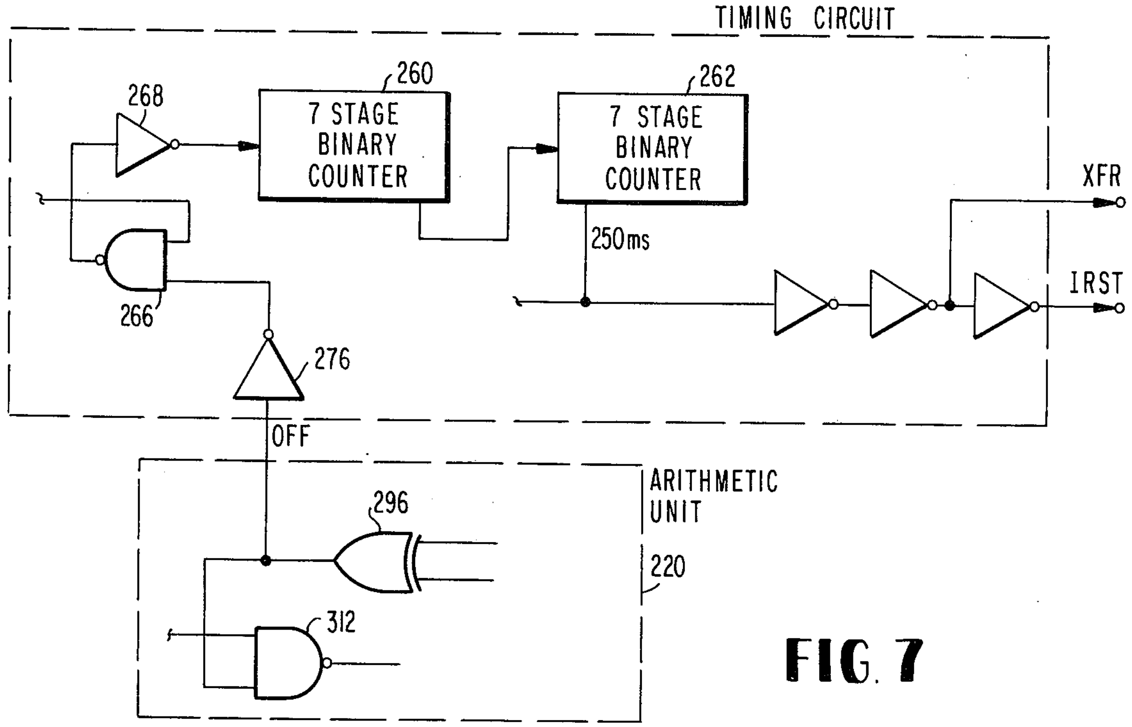
FIG. 7
FIG. 8
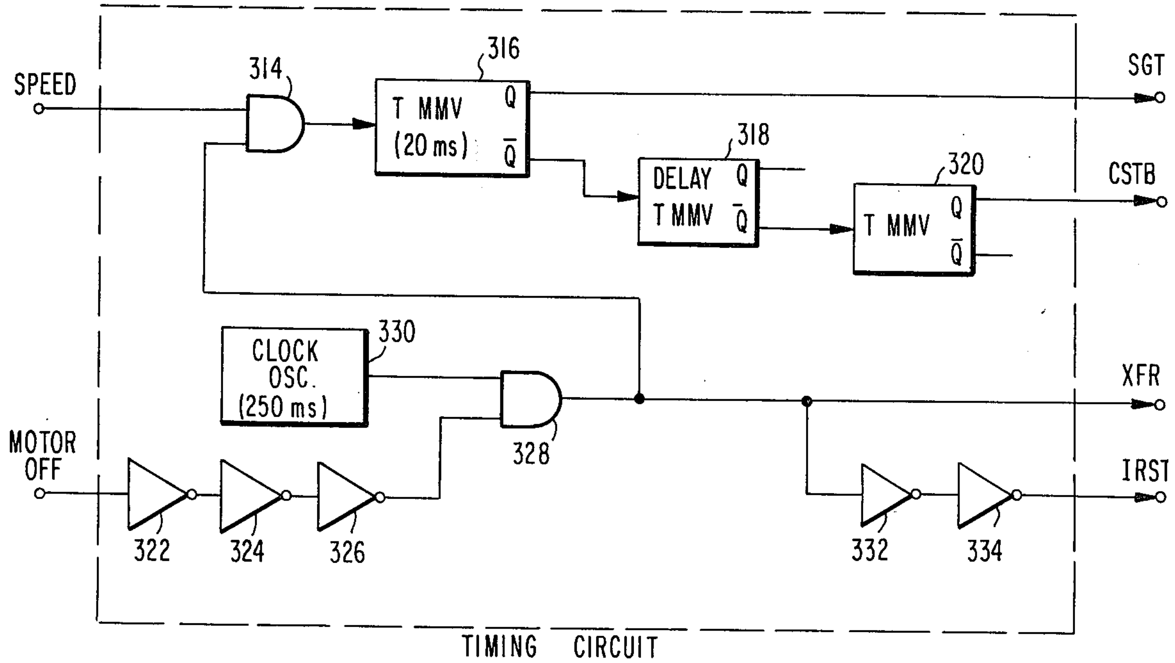

OPEN LOOP HEATING CONTROLLER AND METHOD FOR CORRUGATORS

BACKGROUND OF THE INVENTION

The present invention relates to the production of double-face corrugated paperboard webs formed by laminating flat paper webs to the opposite sides of a corrugated medium and, more particularly, to a method and apparatus for controlling the application of heat to the webs as a function of production factors to aid in the control of warping of the corrugated paperboard.

Corrugated paperboard is manufactured at high production rates on corrugator machines which are well known in the paper industry. A typical corrugator machine joins a flat web usually referred to as a single-face liner to a corrugated medium to form a single-face web. The single-face web is then joined to a second flat web typically referred to as a double-face liner by gluing the liner to the opposite side of the corrugated medium to form a double-face web. The double-face web forms the corrugated paperboard and is typically slit, scored and cut into predetermined lengths to form corrugated paperboard blanks for the production of paperboard containers.

One particular difficulty that has plagued the corrugated paperboard industry for years is that the finished blanks tend to be warped in one or more directions, making it difficult or impossible to form them into containers. This tendency has been attributed at various times to different production factors such as residual stresses, moisture variations, adhesive quantity, induced tension and heat transfer characteristics. Many corrective methods in systems have been used with limited degrees of success as is discussed in U.S. Patent Application Ser. No. 520,687 by Thayer et al, assigned to the assignee of the present invention and hereby incorporated herein by reference.

One factor influencing warp is the amount of heat applied to the various webs or lamina before they are joined as well as heat applied to the single-face web and double-face liner before they are joined. The application of moisture and heat is normally referred to as preconditioning and may result in dimensional changes in the lamina.

In one known system, preheaters are used prior to the single-facing operation and the double-facing operation to control the application of heat to the single-face liner, the single-face web and the double-face liner. The preheater includes a preheater roll into which steam is introduced to heat the roll to a desired temperature. The paper passes over the preheater roll in contact with a selectable circumferential area of the roll. In order to vary the contact area between the paper and the roll, a wrap roll is positioned relative to the preheater roll to vary the angular position at which the paper first contacts the preheater roll and thus the amount of "wrap" of the paper around the preheater roll.

The amount of heat applied to the paper (i.e., the exposure time of the paper to the preheater roll) is thus controlled by controlling the angular position of the wrap roll relative to the preheater roll. In known systems such as that shown in Japanese Pat. No. 49-37994, the exposure or contact time between the paper and the preheater roll is maintained at a constant value through the use of a closed loop servo system with position feedback and speed related control. More specifically, the speed of the paper through the corrugating machine is sensed together with the angular position of the wrap roll. A comparator circuit compares the speed value with the angular position value and a motor drives the wrap roll in the proper direction until a null is obtained between the compared values.

In such an analog closed-loop system, the angular position of the wrap roll must be sensed and provided in the form of a feedback signal in order to correlate position with speed. Additionally, closed-loop analog control is not compatible with digital control systems and, particularly, with open-loop computer control.

It is accordingly an object of the present invention to provide a novel open-loop, digitally operable method and apparatus for controlling the application of heat to webs in preconditioning sections of corrugating machinery as a function of production factors.

It is another object of the present invention to provide a novel wrap roll control circuit and method which is compatible with digital control techniques.

It is yet another object of the present invention to provide a novel open-loop wrap roll control circuit and method which controls the position of the wrap roll of a preheater in accordance with production factors without the necessity for sensing wrap roll position.

These and other objects and advantages of the present invention are provided in accordance with the present invention as will become apparent to one skilled in the art to which the invention pertains from the following detailed description when read in conjunction with the appended drawings.

BRIEF DESCRIPTION OF THE DRAWINGS

FIG. 3 is a functional block diagram illustrating one embodiment of the wrap roll control unit of FIG. 2 in greater detail;

FIG. 5 is a timing diagram illustrating the timing between various output signals of the timing circuit of FIG. 4;

FIG. 7 is a functional block diagram illustrating an alternative speed signal sample control circuit responsive to the condition of the drive motor of FIGS. 2 and 3;

FIG. 8 is a functional block diagram illustrating another embodiment of the timing circuit of FIG. 3 in detail; and, FIG. 9 is a functional block diagram illustrating a manual override circuit operable in conjunction with the wrap roll control unit of FIG. 3.

DETAILED DESCRIPTION

Figure 1:
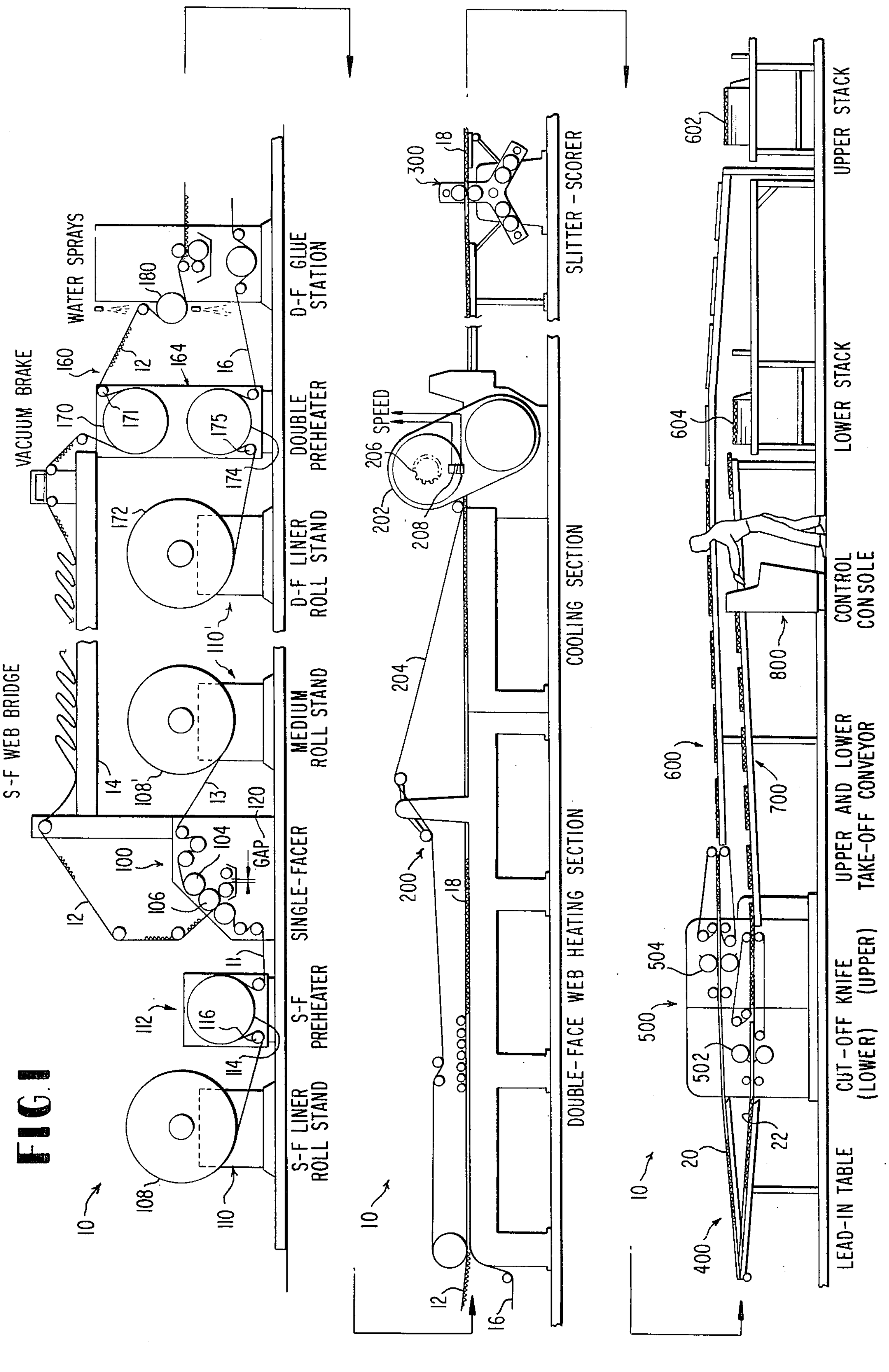
FIG. 1 is a diagram schematically illustrating in side elevation a typical corrugator machine.

FIG. 1 is a schematic diagram illustrating the typical production steps involved in forming double-face corrugated paperboard webs. The corrugator machine schematically illustrated in FIG. 1 is well-known in the art but will briefly be described herein to facilitate a full understanding of the invention. One such machine is described in greater detail in the previously referenced United States Patent Application of Thayer et al which may be referred to for a more detailed description.

With reference now to FIG. 1, a single-face web 12 (S-Fweb) is formed by single-facer generally indicated by the numeral 100. From the single-facer 100, the web 12 advances along a bridge 14 to where it enters the double-facer 200 with the exposed flutes of the medium facing down. A double-face liner 16 (D-F liner) is brought into contact with the single-face web 12 so they enter the double-facer 200 together for joining to form a double-face web 18 (D-F web).

The double-face web advances to a triplex slitter-scorer 300 where it is divided into two or more double-face webs 20 and 22 of selected width. Each of the double-face webs 20 and 22 is scored with a pair of parallel score lines to form fold lines needed in the blanks from which containers are made.

The webs 20 and 22 are advanced from the slitter-scorer 300 over a lead-in table 400 to a rotary cut-off knife generally denoted by the numeral 500. Knife 500 includes a lower knife 502 and an upper knife 504 to which the webs 20 and 22 are directed by the lead-in table 400. Each knife cuts its respective web into the selected blank lengths, the length of the blanks from one web usually being different from the other.

The blanks advance along upper and lower conveyors 600 and 700 to where they are piled in stacks 602 and 604. Thereafter the blanks are automatically or manually removed to a storage area (not shown).

Immediately prior to the single-facer 100 and the double-facer 200, preheaters are utilized to apply heat to the various lamina. In the illustrated machine, for example, the single-face liner is removed from a supply roll 108 of selected width mounted for unwinding on a conventional roll stand 110. The single-face liner passes first through a single-face liner preheater 112. In passing through the preheater 112, the liner contacts a selectable circumferential area of a preheater roller 114. The amount of contact between the liner 11 and the preheater roll 114 i.e., the exposure time between the liner 11 and the preheater roll 114 is selectively controllable through the positioning of a wrap roll 116 as will hereinafter be described in greater detail.

The preheated single-face liner then enters the single-facer 100 where it is joined with a corrugated medium 13 supplied from a supply roll 108' on a medium roll stand 110'. The medium from the roll 108 passes over a conventional steam shower (not shown) through corrugating rolls 104 and 106 which corrugate the medium. The flute tips of the medium are coated with conventional starch adhesive at a glue stand generally indicated at 120 and the single-face liner 11 is brought into contact with the coated flute tips to join the single-face liner to the corrugated medium.

The single-face web 12 is then joined to a double-face liner 16 to form the double-faced paperboard web. However, immediately prior to the joining process, heat is applied to the double-face liner 16 and the single-face web 12 by a double preheater at a double-facer supply section generally indicated at 160. In the double preheater, the single-face web 12 passes over a preheater roll 170 with the single-face liner in contact with the roll 170. The circumferential area of contact and thus the exposure time between the roller 170 and the single-face web 12 is selectively controllable by controlling the position of a wrap roll 171 as in the single-face liner preheater 112. A roll stand 110' for a supply roll 172 provides a supply paper stock of a suitable width for the double-face liner 16. The double-face liner is advanced through the double preheater over a preheater roll 174 with the circumferential area of contact between the liner 16 and the roll 174 controlled by the positioning of a wrap roller 175. The heated single-face web 12 and double-face liner 16 are then joined in the double-facer as is described in greater detail in Thayer et al Patent Application Ser. No. 520,687 incorporated herein by reference.

As was previously mentioned, the amount of heat applied to the various lamina by the preheaters 112 and 164 is controlled through the positioning of movable wrap rolls 116, 171 and 175. One form of a system for controlling the position of the movable wrap rolls in accordance with the present invention is illustrated in FIGS. 2–8. Since the positioning system may be substantially the same for all of the preheater sections, only one positioning system, the one utilized in conjunction with the single-face preheater 112 is illustrated and described hereinafter.

Figure 2:
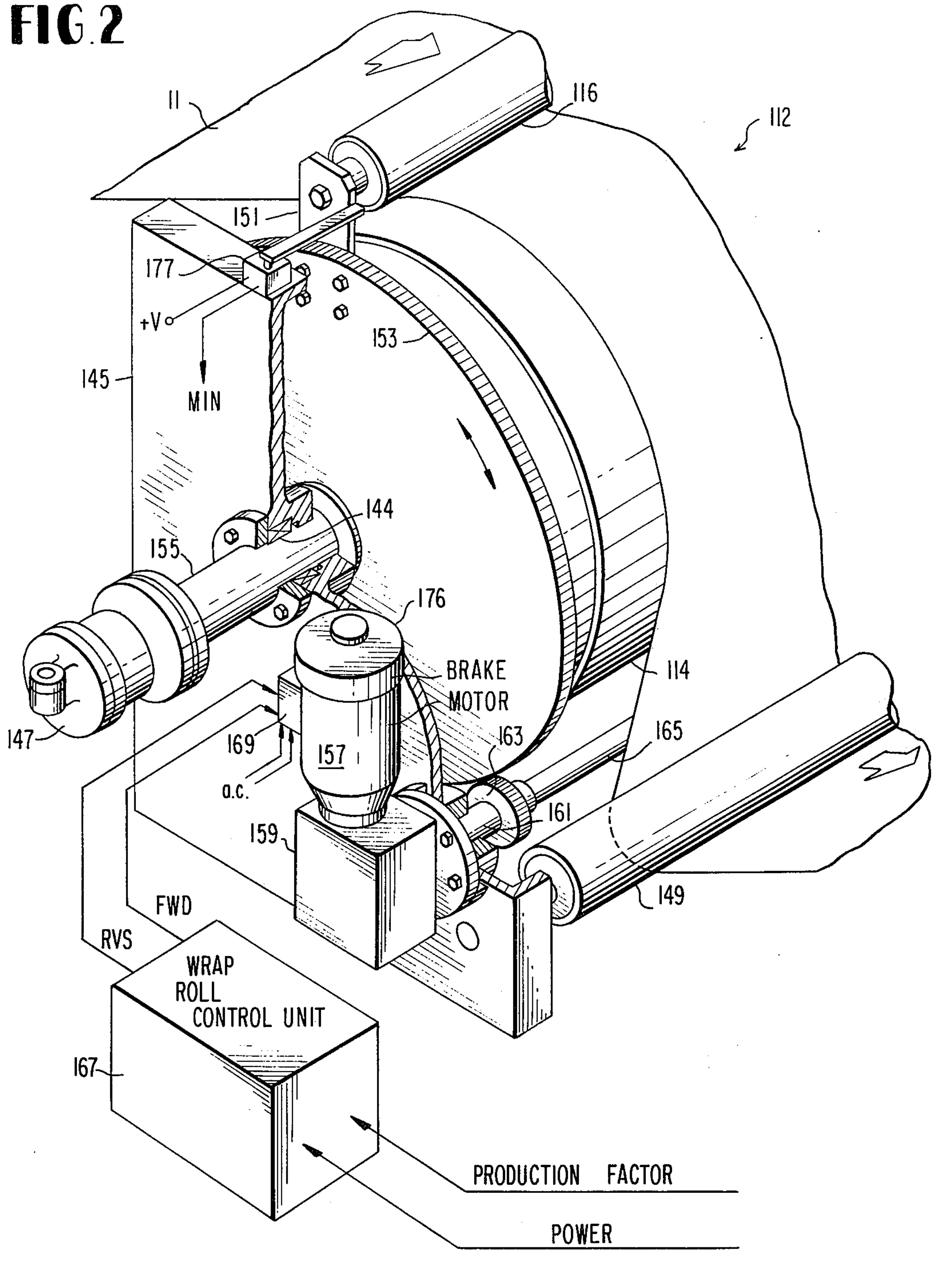
FIG. 2 is an enlarged schematic illustration of the single-face liner preheater assembly of FIG. 1 functionally illustrating a wrap roll control unit according to the invention.

The amount of wrap of the single-face liner, single-face web and double-face liner around their respective preheater rolls is preferably controlled according to the present invention by the apparatus shown in FIG. 2, which is substantially identical for the single preheater 112 and double preheater 164 (FIG. 1); to simplify illustration, FIG. 2 shows a single preheater such as preheater 112 of FIG. 1 although the moveable wrap arm 116 is shown in a minimum wrap position whereas it is shown in a maximum wrap position in FIG. 1.

The preheater 112 includes a large hollow roll 114 of conventional construction mounted for rotation in bearings 144 in a main support 145. Steam is introduced through a conventional rotary union 147 to heat the roll 114 to the desired temperature. Roll 114 is rotated solely by the friction of the single-face liner 11 passing around the roll.

A guide roll 149 is also bearing mounted for rotation in support 145 at the fixed location shown to maintain the position that the single-face liner 11 leaves roll 114. However, the position that the single-face liner 11 comes into contact with roll 114 is variable in accordance with the circumferential position of the wrap roll 116 around roll 114 to provide the amount of wrap desired to control the amount of heat applied to single-face liner 11.

The orbital positioning of wrap roll 116 is accomplished by bearing mounting the wrap roll for rotation between a pair of support arms 151 (only one shown) which in turn are secured to large toothed gears 153 (only one shown) which are bearing mounted around the journal 155 of roll 114. It should be understood that the gears 153 may be rotated around the journal 155 without affecting rotation of roll 114. Thus, it can be seen that rotation of gears 153 counterclockwise, as viewed in FIG. 2, will move wrap roll 116 to another position around roll 114 and thereby changing the distance that single-face liner 11 is wrapped around the heated roll 114.

It has already been explained that the amount of wrap and the speed of the corrugator control the amount of heat applied to single-face liner 11 and that the amount of heat may be maintained constant by increasing the amount of wrap as the speed of the corrugator is increased. The gears 153 are rotated by an electric motor 157 connected to a conventional right angle gear box 159 secured to support 145. Gear box 159 includes an output shaft 161 upon which small pinion gears 163 (only one shown) are secured in meshing engagement with the large gears 153. Thus, operation of positioning motor 157 rotates gears 153 to position the wrap roll 116 around the circumference of large roll 114. A cross shaft 165 connects output shaft 161 to the similar pinion 163 and gear 153 on the other side of the machine (not shown).

The positioning of wrap roll 116 is controlled by a wrap roll control unit 167 which supplies forward and reverse control signals FWD and RVS to drive the motor 157 through a conventional optical isolator 169. The isolator 169 receives an a.c. input (e.g. 115 volts 60Hz.) and causes the motor 157 to drive in one direction or the other for a determined period of time under the control of the signals FWD and RVS from the control unit 167. The control unit receives power from a suitable d.c. source and generates the FWD and RVS motor control signals in response to at least one production factor such as corrugator speed as will subsequently be described in greater detail. The illustrated motor is an a.c. induction motor 157 and may be provided with a conventional brake 176 which is applied whenever the motor is not energized. It will be appreciated, of course, that the wrap roll positioning motor 157 may be a d.c. stepping motor or the like.

The wrap roll 116 is positionable between positions of maximum and minimum wrap in the manner described above, with the total travel between these two positions being about 90° (e.g. 87°) in the illustrated machine. The illustrated corrugator machine operates between a minimum or idle speed of about 90 feet per minute (f.p.m.) and a maximum speed of about 750 f.p.m. at all times unless the machine is shut down temporarily for repairs or the like. At corrugator idle speed the wrap roll is in its minimum position as shown in FIG. 2, and at corrugator maximum speed the wrap roll is displaced about 90° from this minimum position (e.g. maximum wrap as shown in FIG. 1). The motor 157 drives the wrap roll at a rate of about 6° per second so it typically requires about 16 seconds for the wrap roll 116 to be driven between the extreme positions by the motor 157. Movement of the wrap roll may be limited between these extreme positions through the use of conventional limit switches such as the limit switch 177 which detects the minimum extreme position of the wrap roll. As will be discussed hereinafter in greater detail, an output signal MIN developed by the switch 177 may be used in conjunction with the control unit 167 in the positioning of the wrap roll 116.

One embodiment of the wrap roll control unit 167 of FIG. 2 is illustrated functionally in FIG. 3. Referring now to FIG. 3, a signal related to a production factor of the corrugator (e.g. the speed of the corrugator) is periodically sampled by the wrap roll control unit 167 to detect variations in that production factor.

For example, a signal SPEED indicative of the speed of the corrugator may be generated and supplied to the control unit 167 in a conventional manner. The speed of the drive unit 202 driving the belt 204 which drives the double-face paperboard web 18 through the corrugator may be sampled in a conventional manner. As is shown in the FIG. 1 embodiment, for example, a gear 206 having one hundred and twenty magnetic teeth is driven by the drive unit 202. A pick up coil 208 positioned adjacent the gear 206 thus provides output pulses related in frequency to the speed of the corrugator. For example, this speed signal may vary from 0–825 pulses per second (p.p.s.) over a corrugator speed range of 0–750 f.p.s.

As is shown in FIG. 3, the speed signal SPEED may be applied both to a sample gate 210 and a timing circuit 212 described hereinafter in greater detail. The sample gate may be a conventional two input terminal AND gate and the gated or sampled output signal GSP from the sample gate 210 may be applied to the clock input terminal CL of a conventional pulse input counter 214 such as a four-bit binary counter. The output signal INP from the input counter 214 may be supplied to parallel input terminals of PI of a memory counter 216, to a comparator 218 and to an arithmetic unit 220 described hereinafter in greater detail. The output signal MEM from the memory counter may be supplied to the comparator 218 and to the arithmetic unit 220, and then comparator output signals INC (MEM < INP) and DEC (MEM > INP) may also be supplied to the arithmetic unit 220.

Various synchronized timing and gating signals may be supplied from the timing circuit 212. The timing circuit 212 may supply a sample gate signal SGT to the sample gate 210 and to the inhibit input terminal INH of the comparator 218. An input reset signal IRST may be supplied to reset input terminal R of the input counter 214 and a data transfer signal XFR may be supplied to the strobe input terminal STB of the memory counter 216. The arithmetic unit 220 may supply the forward and reverse signals FWD and RVS to the isolators 169 and the motor circuit 157 as is subsequently described in greater detail.

In operation, the sample gate signal SGT periodically enables the sample gate 210 to sample the speed signal for a predetermined period of time. The pulses of the speed signal sampled during the time period determined by the duration of the sample gate SGT are counted by the input counter 214. During this counting interval, the comparator 218 is inhibited.

The count in the input counter 214 at the end of the sample period is compared to the count in the memory counter 216 by the comparator 218. As will be seen, the count in the memory counter 216 is indicative of corrugator speed during the immediately preceeding sample period. The comparator 218 compares the stored and current speed samples and determines whether or not there is a difference between the compared signals. If there is a difference, comparator 218 supplies either the INC or DEC signal to the arithmetic unit 220 to indicate in which direction speed has changed.

For example, if the stored speed value is greater than the current speed value, indicating a decrease in speed during the interval between successive samples, the comparator 218 supplies the DEC signal to the arithmetic unit 220 indicating that speed has decreased and that the amount of wrap of the liner around the preheater roll must be decreased to maintain exposure time between the liner and the roll at a constant value. Similarly, if the stored speed value in the memory counter 216 is smaller than the current speed value in the input counter 214, then speed has increased and the comparator 218 provides the increase wrap signal INC to the arithmetic unit 220 to indicate wrap must be increased to maintain a constant exposure time.

The arithmetic unit 220 subtracts the smaller of the two signals INP and MEM from the larger of the two to provide a difference signal indicative of the speed change between successive samples. As will subsequently be described in greater detail, the speed difference signal together with the direction indicative signals INC and DEC are utilized to generate the motor control signals FWD and RVS to drive the wrap roll 116 in the proper direction and for the proper distance dictated by the speed change. In the illustrated embodiment of the invention, the drive motor 157 is an a.c. induction motor and the degree of angular movement and direction of angular movement is controlled by providing one of the two signals FWD and RVS (direction) and controlling the duration of the provided signal (distance) in relation to the speed difference.

For example, in the corrugator system described in the referenced Thayer et al patent application, the motor 157 will drive the wrap roll 116 between a minimum wrap position (FIG. 2) and a maximum wrap position (FIG. 1), an angular movement of about 90°, in about 16 seconds when energized. Accordingly, if the motor 157 is energized for a full 16 seconds, the wrap roll 116 will move through an arc of about 90° in the direction dictated by the comparator output signals. Likewise, energization of the motor 157 for 1 second will change the angular position of the wrap roll 116 about 6° in the direction dictated by the comparator output signals.

The memory counter 216 always maintains the last speed value for which the wrap roll 116 was positioned. Thus, after the current and stored speed values have been compared and the motor 157 has moved the wrap roll 116 to its new position, the signal in the input counter 214 is transferred into the memory counter 216 in response to the transfer signal XFR and the input counter 214 is reset by the input counter reset signal IRST. Since the maximum time travel of the wrap roll 116 is approximately 16 seconds for a worse case condition, the transfer of the latest speed sample from the input counter to the memory counter and the subsequent resetting of the input counter may be timed to occur at a fixed 16 second interval. Accordingly, the sampling of the speed signal may also occur periodically at 16 second intervals.

Of course, most of the corrugator speed changes will be less than the maximum change between idle speed and maximum operating speed. Accordingly, the sampling period may be responsive to the energization of the motor 157 so as to provide more frequent updating. For example, as is illustrated in phantom in FIG. 3 and described hereinafter in connection with FIG. 7, a motor-off signal OFF may be supplied from the arithmetic unit 220 to the timing circuit 212 so that sampling of the speed signal can occur at intervals more frequent than the maximum 16 second interval as long as the motor 157 is not energized.

Figure 4:
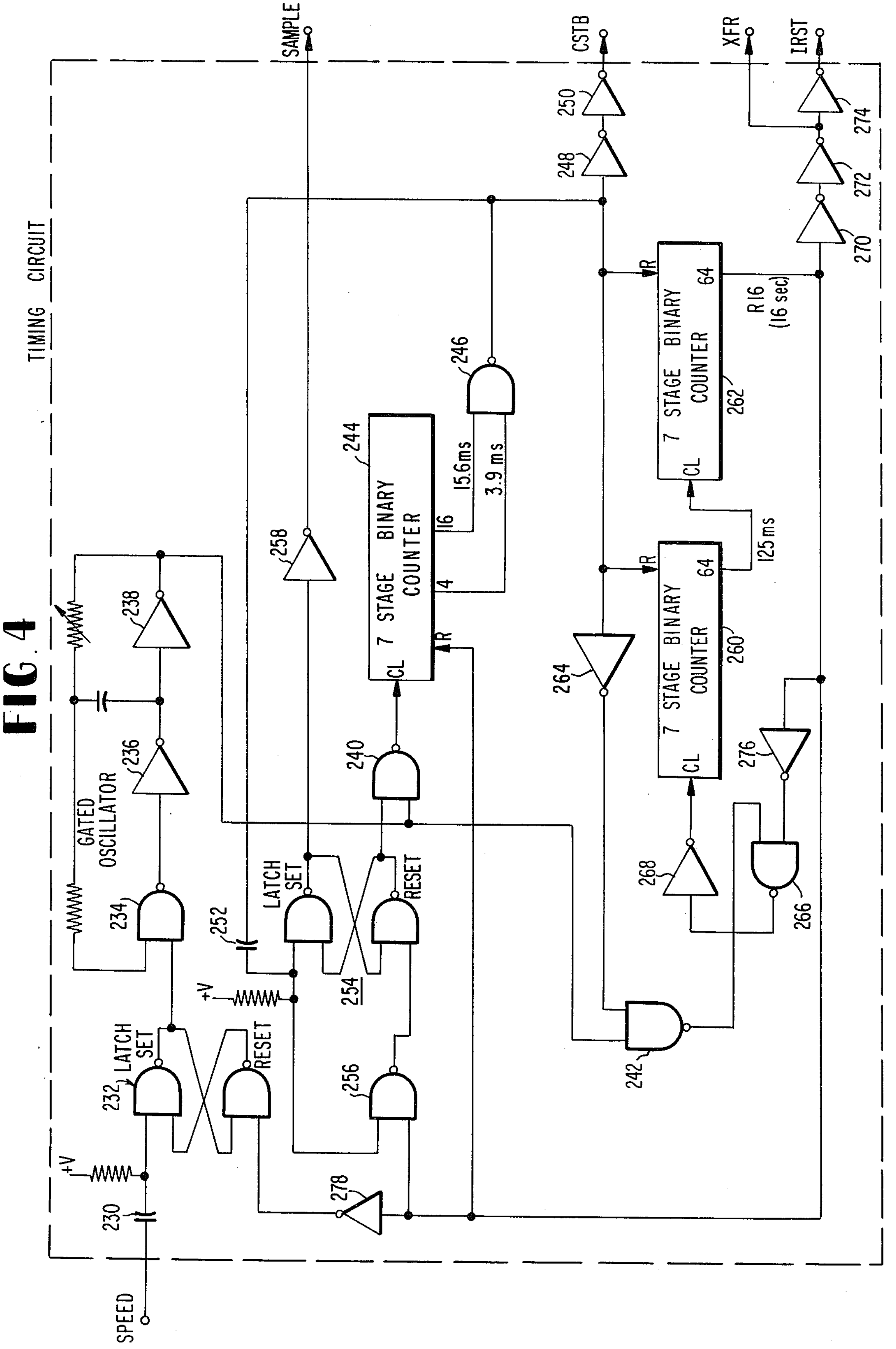
FIG. 4 is a functional block diagram illustrating one embodiment of the timing circuit of FIG. 3 in greater detail.

One embodiment of the timing circuit 212 of FIG. 3 is illustrated in greater detail in FIG. 4 to facilitate an understanding of the invention.

Referring now to FIG. 4, the speed signal from the magnetic pick-up unit 208 of FIG. 1 may be supplied through a coupling capacitor 230 to one input terminal of a conventional latch circuit generally indicated at 232. The "set" output signal from the latch 232 may be supplied to one input terminal of a two input terminal NAND gate 234 and the output signal from the NAND gate 234 may be applied through inverters 236 and 238 connected with the NAND gate 234 in a conventional manner to form a gated oscillator. The output signal from the gated oscillator, i.e. the signal from the inverter 238, is applied to one input terminal of a two input terminal NAND gate 240 and to one input terminal of a two input terminal NAND gate 242. The output signal from the NAND gate 240 is applied to the clock input terminal CL of a suitable conventional 7-stage binary counter 244 and the output signals from the binary "4" and binary "16" output terminals of the counter 244 are supplied to the respective input terminal of a two input terminal NAND gate 246.

The output signal from the NAND gate 246 is supplied through first and second inverters 248 and 250 as the counter strobe signal CSTB and through a coupling capacitor 252 to one input terminal of a suitable conventional latch circuit generally indicated at 254. The "set" input terminal of the latch circuit 254 is also connected to one input terminal of a two input terminal NAND gate 256, the output signal from which is applied to the "reset" input terminal of the latch circuit 254. The "set" output terminal of the latch circuit 254 is supplied through an inverter 258 as the sample gate SGT as illustrated. The other output terminal of the latch 254 is connected to the second input terminal of the NAND gate 240 as illustrated.

The output signal from the NAND gate 246 is also supplied to the reset input terminals R of first and second conventional 7-stage binary counters 260 and 262. The signal from the NAND gate 246 is also inverted through an inverter 264 and applied to the other input terminal of the NAND gate 242. The output signal from the NAND gate 242 is applied to one input terminal of a two input terminal NAND gate 266, the output signal from which is applied through an inverter 268 to the clock input terminal CL of the counter 260.

The output signal from the binary "64" output terminal of the counter 260 is applied to the clock input terminal CL of the counter 262. The output signal from the binary "64" output terminal of the counter 262, a pulse R16 occurring about 16 seconds after occurrence of the sample gate, is supplied through inverters 270 and 272 as the transfer output signal XFR. The transfer output signal from the inverter 272 is delayed through an inverter 274 and is supplied as the input register reset signal IRST. The 16 second pulse signal R16 from the counter 262 is also supplied through an inverter 276 to the other input terminal of the NAND gate 266, to the reset input terminal R of the counter 244, to the second input terminal of the NAND gate 256, and through an inverter 278 to the second input terminal of the latch circuit 232.

The operation of the timing circuit of FIG. 4 may be more clearly understood with continued reference to FIG. 4 and with reference to the timing diagram of FIG. 5.

Referring now to FIGS. 4 and 5, the 16 second interval pulse R16 from the counter 262 resets the latch circuits 232 and 254 as well as the counter 244. The sample gate SGT assumes a high signal level starting a 20 millisecond sampling period. Thereafter, the first pulse of the speed signal sets the latch circuit 232 and holds the gated oscillator in an on condition to supply oscillator pulses to the counter 244 through the NAND gate 240.

The oscillator 244 counts the pulses from the gated oscillator until a count of 20 is reached. The gated oscillator provides output pulses at 1 millisecond intervals and when the count of 20 is reached by the counter 244 (after approximately 20 milliseconds), the NAND gate 246 detects this condition and toggles the latch circuit 254 to end the 20 millisecond sampling period, generates the counter strobe signal CSTB and resets the counters 260 and 262 while enabling the NAND gate 242. The pulses from the gated oscillator are then passed by the NAND gate 242 to the NAND gate 266 which is enabled by the absence of the R16 signal sensed through the inverter 276.

The counters 260 and 262 thus count the pulses from the gated oscillator until the binary "64" output signal from the counter 262 assumes a high signal level after approximately 16 seconds. At that time, the counters 260 and 262 are inhibited from further counting, the counter 244 is reset, resetting the counters 260 and 262, the latches 232 and 254 are reset, and the transfer and input counter reset signals XFR and IRST respectively, are generated. The timing cycle then begins anew.

Figure 6:
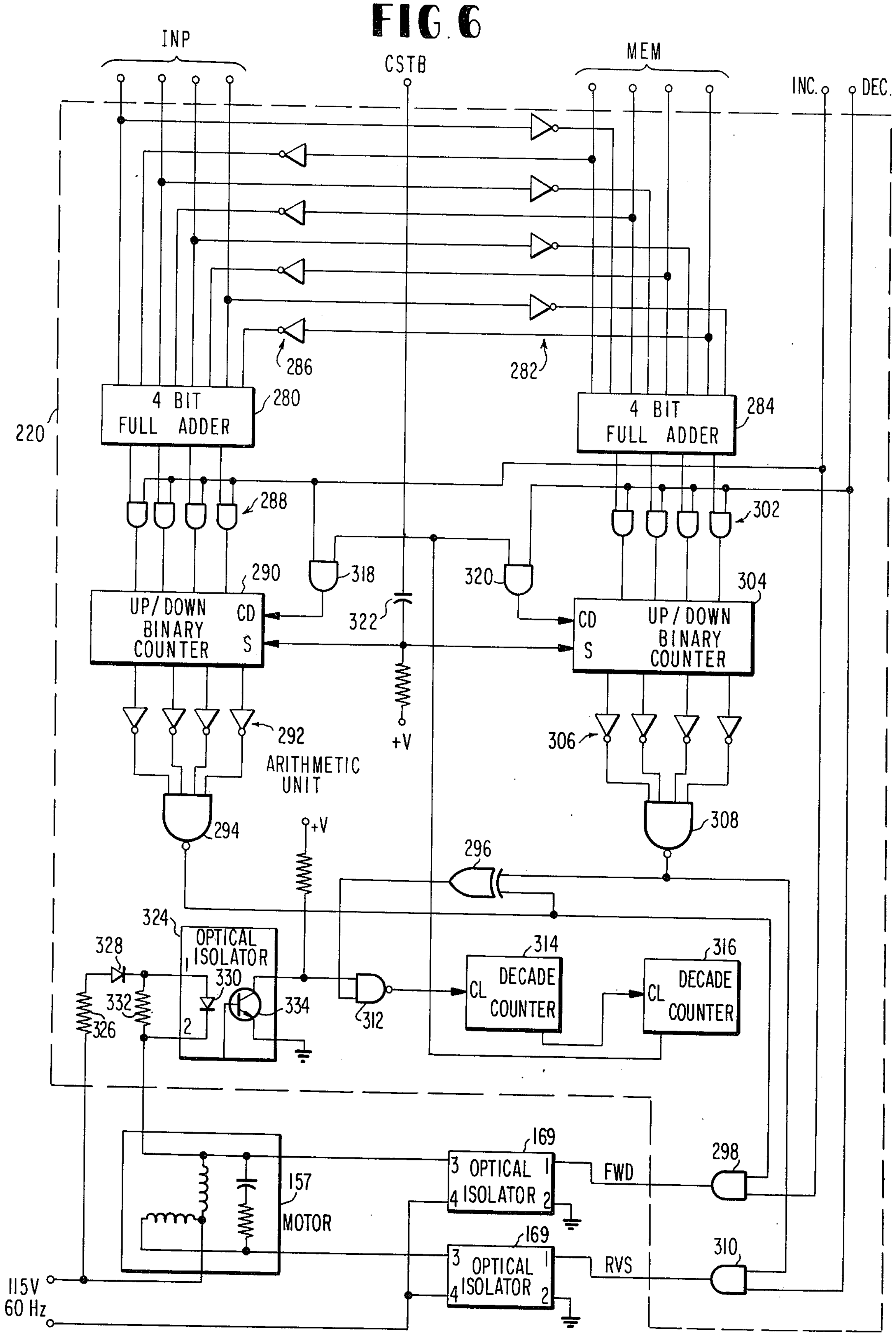
FIG. 6 is a functional block diagram illustrating one embodiment of the arithmetic unit of FIG. 3 in greater detail.

One embodiment of the arithmetic unit 220 of FIG. 3 is illustrated in greater detail in the functional block diagram of FIG. 6 to facilitate an understanding of the present invention.

Referring now to FIG. 6, the INP signal from the input counter 214 of FIG. 3 is applied to a suitable convention 4-bit bull adder 280 and is inverted through inverters 282 and applied to a second 4-bit full adder 284. The signal MEM from the memory counter 216 of FIG. 3 is applied to the 4-bit full adder 284 and is inverted through inverters 286 and applied to the 4-bit full adder 280.

The output signals from each data output terminal of the full adder 280 are applied to the respective input terminals of associated AND gates generally indicated at 288. The signals from the AND gates 288 are applied to the parallel input terminals of a conventional 4-bit up/down binary counter 290 and the four ouput signals from the counter 290 are applied through inverters indicated at 292 to the four input terminals of a conventional four input terminal NAND gate 294. The output signal from the NAND gate 294 is applied to one input terminal of a conventional exclusive OR gate 296 and to one input terminal of a two input terminal AND gate 298. The output signal from the AND gate 298 is applied as the forward drive signal FWD to the optical isolator 169 which in turn controls the drive of the motor 157 in the forward direction.

The output signals from the 4-bit fuller adder 284 are similarly gated through AND gates 302 and applied to a conventional up/down binary counter 304. The output signals from the counter 304 are applied through inverters 306 to a four input terminal NAND gate 308. The output signal from the NAND gate 308 is applied to the other input terminal of the exclusive OR gate 296 and to one input terminal of the two input terminal AND gate 310. The output signal from the AND gate 310 is applied as a reverse motor control signal RVS to the optical isolator 169 for control of the motor 157 in the reverse direction.

The output signal from the exclusive OR gate 296 is supplied to one input terminal of a two input terminal NAND gate 312 and the output signal from the NAND gate 312 is applied to the clock input terminal of a conventional decade counter 314. The divide-by-ten output terminal of the decade counter 314 is connected to the clock input terminal of a second conventional decade counter 316 and the divide-by-six output terminal of the decade counter 316 is applied to one input terminal of each of the two input terminal AND gates 318 and 320. The output signal from the AND gate 318 is applied to the clock down input terminal CD of the counter 290 and the output signal from the AND gate 320 is applied to the clock down input terminal CD of the counter 304.

The counter strobe signal CSTB from the timing circuit 212 of FIG. 3 is coupled through a capacitor 322 to the reset input terminals R of each of the counters 390 and 304. The increase wrap signal INC from the comparator 218 of FIG. 3 is applied to the second input terminal of each of the AND gates 288 to the second input terminal of the AND gate 318 and to the second input terminal of the AND gate 298. The decrease wrap signal DEC from the comparator 218 of FIG. 3 is applied to the second input terminal of each of the AND gates 302, to the second input terminal of the AND gate 320 and to the second input terminal of the AND gate 310.

A conventional optical isolator 324 receives one side of the 115 volt 60 Hz line voltage to provide 60 Hz timing pulses to the NAND gate 312 as is illustrated in FIG. 6. Specifically, one side of the 115 volt 60 Hz line is connected through a current limiting resistor 325 and a diode 328 to the light emitting diode 330 in the optical isolator 324. A resistor 332 is connected across the light emitting diode 330. The cathode electrode of the diode 330 is connected to the motor circuit 157 as illustrated. A light responsive transistor 334 in the optical isolator 324 is connected in a suitable manner to couple the light pulses produced by the diode 330 to the other input terminal of the NAND gate 312.

In operation, the full adder 280 subtracts the stored speed signal MEM from the current speed signal INP and supplies the difference signal to the AND gates 288. Similarly, the full adder 284 subtracts the current speed signal INP from the stored speed signal MEM and supplies the difference to the AND gates 302.

If the current speed signal INP is greater than the stored speed signal MEM (i.e., there has been an increase in speed since the last sample period), the increase wrap signal INC enables the AND gates 288 and the difference signal is strobed into the up/down binary counter 290 by the CSTB signal. The AND gates 318 and 298 are also enabled by the INC signal. The NAND gate 294 detects a signal other than zero in the counter 290 and assumes a high signal level, providing a forward drive signal FWD through the enabled AND gate 298 and also enabling the NAND gate 312 through the exclusive OR gate 296.

The optical isolator 324 applies a 60 Hz clock signal to the enabled NAND gate and the decade counters 314 and 316 divide the 60 Hz clock by 60 to provide pulses at 1 second intervals to the clock down input terminal CD of the counter 290 through the enabled AND gate 318. The counter 290 then counts down to zero from the stored speed difference count. When the counter 290 reaches a count of zero, the NAND gate 294 detects this condition and inhibits the AND gate 298 and the NAND gate 312, causing the motor 157 to stop. The motor brake is applied at this same time to prevent the motor 157 from overshooting the new position.

It can thus be seen that the motor 157 is energized for a time period related to the change in speed between two successive samples of the speed input signal. Moreover, since the 4-bit full adder 284 operates in conjunction with the counter 304, the NAND gate 308 and the AND gate 310 in the same fashion as described above but in response to the decrease wrap signal DEC, the direction in which the motor 157 is driven is also controlled by the direction of the speed change between successive samples of the speed signal.

As previously mentioned, the motor 157 requires about a 16 second time interval to drive the wrap roll 116 (FIG. 2) between the extreme maximum and minimum wrap positions. Accordingly, sampling of the speed signal may be accomplished at 16 second intervals to insure that the motor 157 is off when a new sample is taken. As an alternative, the timing circuit 212 of FIGS. 3 and 4 may be cycled in response to a motor off signal OFF generated by the arithmetic unit 220 of FIG. 6 or in any other suitable manner.

For example, as is illustrated in FIG. 7 wherein detailed portions of the timing circuit 212 and the arithmetic unit 220 are illustrated, the output signal from the exclusive OR gate 296 of the arithmetic unit may be provided as the motor off signal OFF since this output signal is high or binary ONE only when the motor is running. With reference to FIG. 7 and with reference to FIG. 4, the 250 millisecond output signal from the binary counter 262, rather than the 16 second signal R16, may be utilized as illustrated, to generate the transfer signal XFR and the input counter reset signal IRST. This 250 millisecond signal may also be used to reset the counter 244 and may be provided as an input signal to both the inverter 278 and the NAND gate 256 in the timing circuit (FIG. 4). However, the inverter 276 may be disconnected from the counter 262 and the motor off signal OFF may be supplied from the arithmetic unit 220 through the inverter 276 to the NAND gate 266.

It will be appreciated that in this manner, the speed signal will be sampled every 250 milliseconds as long as the motor 157 is not energized. When the motor 157 is energized, sampling of the speed signal will be delayed until the motor 157 is again deenergized as will be indicated by the level of the OFF signal. Thus, for example, if the comparison between the current speed and the stored speed indicates a change in wrap roll position requiring a 2 second energization of the motor 157, sampling of the speed signal will be inhibited during this 2 second interval and will be resumed approximately 250 milliseconds after the motor 157 has been deenergized.

An alternative embodiment of the timing circuit 212 of FIG. 3 is illustrated in FIG. 8. The FIG. 8 embodiment of the timing circuit incorporates the motor condition responsive sampling of the speed input signal as in the FIG. 7 embodiment and also synchronizes the sampling period with the incoming speed pulses for greater accuracy in sampling speed.

Referring now to FIG. 8, the speed signal from the magnetic pickup 208 of FIG. 1 is applied to one input terminal of a two input terminal AND gate 314 and the output signal from the AND gate 314 is applied to the trigger input terminal T of a conventional one shot or monostable multivibrator 316. The output signal from the true output terminal Q of the multivibrator 316 is supplied as the sample gate output signal SGT of the timing circuit. The output signal from the false or $\overline{Q}$ output terminal of the multivibrator 316 is applied to the trigger input terminal T of a conventional delay monostable multivibrator 318. The output signal from the false or $\overline{Q}$ output signal of the multivibrator 318 is supplied to the trigger input terminal T of a conventional monostable multivibrator 320 and the output signal from the true output terminal Q of the multivibrator 320 is supplied as the counter strobe output signal CSTB of the timing circuit.

A motor off signal such as the OFF signal from the arithmetic unit 220 of FIG. 6 is delayed through a series of inverters 322, 324 and 326 and applied to one input terminal of two input terminal AND gate 328. The output signal from a conventional clock oscillator 330 providing output pulses, for example, at 250 millisecond intervals, is applied to the other input terminal of the AND gate 328. The output signal from the AND gate 328 is applied to the other input terminal of the AND gate 314 and is supplied both directly as the transfer signal XFR and through delay inverters 332 and 334 as the input counter reset signal IRST.

In operation, the clock oscillator 330 supplies a clock pulse every 250 milliseconds and, if the drive motor 157 is off, the clock pulses are gate through the AND gate 328. Each clock pulse from the AND gate 328 transfers the count in the input counter to the memory counter and resets the input counter (FIG. 3) through the generation of the XFR and IRST signals, respectively. In addition, the AND gate 314 is enabled and the next speed pulse occurring in the speed signal SPEED triggers the multivibrator 316 to generate the 20 millisecond sample period. At the end of the 20 millisecond sample period, the delay multivibrator 318 is triggered and, after introducing a slight delay, triggers the multivibrator 320 to generate the counter strobe signal CSTB.

It will be appreciated by one skilled in the art that the circuit of FIG. 8 supplies a sample gate SGT in synchronism with the speed signal SPEED to insure greater accuracy between sampled speed signals in each sampled period. Moreover, the overall sample cycle is never any longer than about 250 milliseconds plus the time required for the motor 157 to move the wrap roll to a new commanded position. Accordingly, the updating of speed is accomplished at relatively short, periodic intervals.

As was previously mentioned in connection with FIGS. 1 and 2, the corrugator machine is usually run between an idle speed of about 90 f.p.m. and a maximum speed of about 750 f.p.m. unless shut down completely for some reason. The machine may be halted in a slow, orderly manner in which event the wrap roll will be in the minimum wrap position at the 90 f.p.m. speed (FIG. 2) and the memory counter 216 (FIG. 3) will retain the speed count equivalent to 90 f.p.m., e.g., a count of one. When the machine is brought back up to the idle speed of 90 f.p.m., the first speed input sample will correspond to the stored speed sample and the wrap roll will thereafter be driven to increase wrap as speed is increased.

In an emergency stop condition, the wrap roll may be in a maximum wrap position (e.g., when the machine is rapidly halted from a high speed of 750 f.p.m.). If the wrap roll is allowed to drive to a minimum wrap position as the machine stops, slack may develop in the liner between the supply roll 108 and the wrap roll 116 (FIG. 1). Accordingly, the wrap roll control unit may be inhibited from driving the wrap roll and the memory counter may be forced to retain the last stored speed signal in an emergency stop condition. These inhibiting signals may be removed once the machine is up to or above idle speed. Inhibiting or disabling of the control unit under such conditions may be accomplished in response to the emergency stop switch in any suitable manner. It may be necessary or desirable for the operator to change wrap roll position from time to time independently of the stored speed sample. For example, such independent control may be desirable for calibration of the control unit after certain periods of operation. One manner in which calibration may be accomplished is illustrated in FIG. 9.

Figure 9:
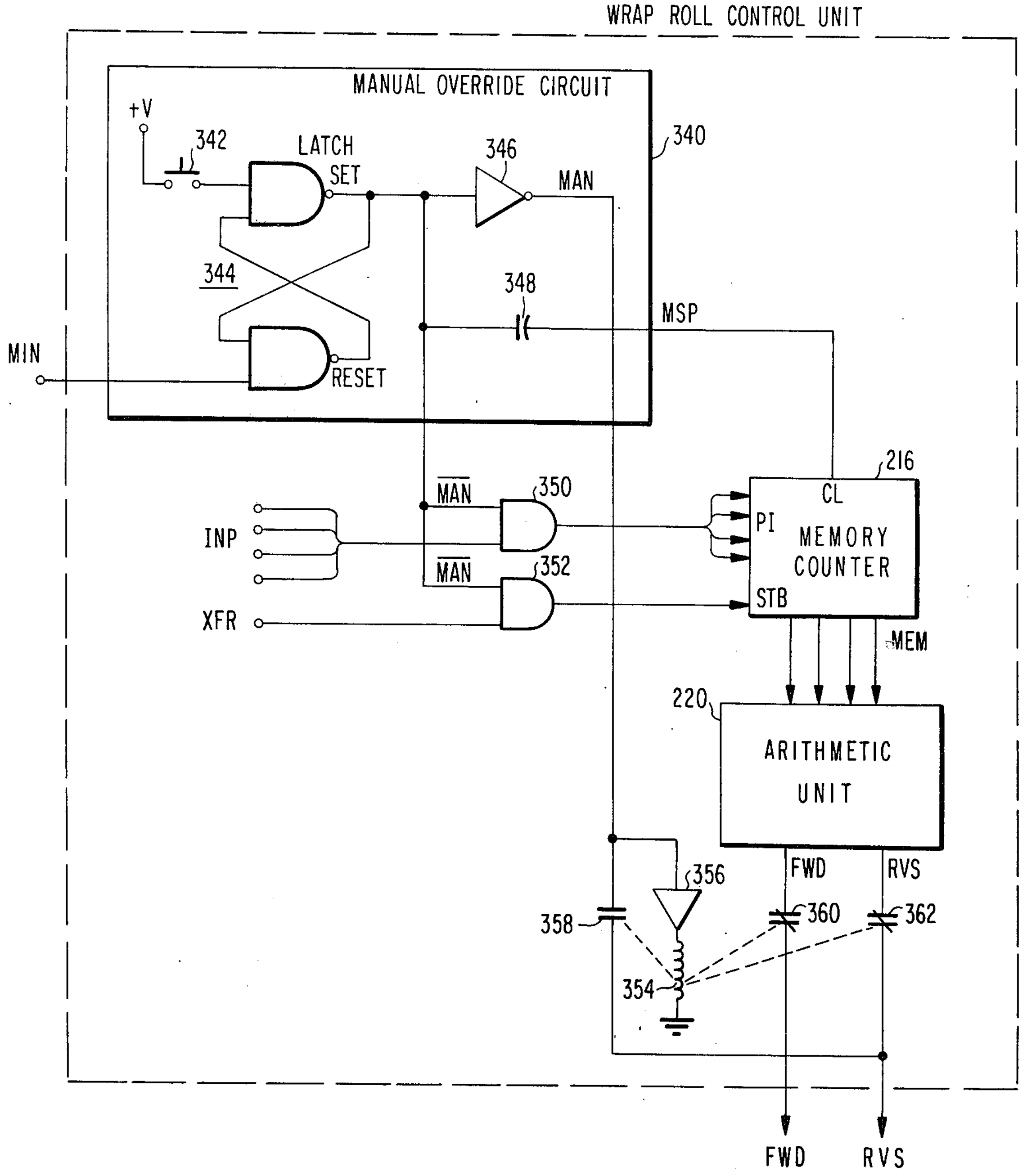

In FIG. 9, a portion of the wrap roll control unit of FIG. 3 is illustrated together with a manual override circuit 340 for calibration of the control unit. Referring now to FIG. 9, a push botton manual override switch 342 may be connected to apply a positive potential +V to the "set" input side of a conventional latch circuit 344. The limit signal MIN from the limit switch 177 of FIG. 2 may be applied to the "reset" input side of the latch circuit 344.

The output signal from the "set" output terminal of the latch circuit 344 may be supplied as the "not manual" output signal $\overline{MAN}$ of the override circuit 340 and may also be inverted through an inverter 346 to supply a "manual" output signal MAN. The $\overline{MAN}$ signal may be coupled through a coupling capacitor 348 as the manual shift pulse MSP for application to the serial data or clock input terminal of the memory counter 216 previously discussed in connection with FIG. 3. The $\overline{MAN}$ signal may also be supplied to one input terminal of each of a plurality of conventional two input terminal AND gates 350 (only one shown) and to one input terminal of a conventional two input terminal AND gate 352.

The signal INP from the input counter 214 of FIG. 3 may be applied to the other input terminals of each of the AND gates 350 rather than directly to the memory counter as in FIG. 3, and the output signals from the AND gates 350 may be applied to the parallel input terminals PI of the memory counter 216. The transfer signal XFR from the timing circuit 212 of FIG. 3 may be applied to the second input terminal of the AND gate 352 rather than directly to the memory counter as in FIG. 3, and the output signal from the AND gate 352 may be applied to the inhibit input terminal INH of the memory counter 216.

The MAN signal from the manual override circuit may be applied through a drive amplifier 356 to a coil 354 of a relay having normally open relay contacts 358 and normally closed contacts 360 and 362. The manual signal MAN may be applied through the normally open contacts 358 as the reverse motor drive signal RVS. The respective forward and reverse motor drive signals FWD and RVS from the arithmetic unit 220 may be supplied as output signals of the control unit through the respective normally closed contacts 360 and 362.

In operation, the latch 342 is "set" in response to depression of the switch 342 by the operator. The "set" output side of the latch (the MAN signal) assumes a low or binary ZERO signal level and inhibits the AND gates 350 and 352. The $\overline{MAN}$ signal energizes the relay coil 354, closing the contacts 358 and opening the contacts 360 and 362. The wrap roll drive motor is thereby driven in a reverse direction toward the minimum wrap position by the MAN signal.

The drive signal RVS continues to drive the wrap roll motor will the wrap roll is driven into the limit switch 177 (FIG. 2). When the wrap roll is driven into the limit switch, the minimum wrap position has been reached and the limit switch generates the MIN signal, resetting the latch circuit 344. Since this position corresponds to idle speed (90 f.p.m.), and idle speed is represented by a count of one, a pulse is clocked into the memory counter 216, e.g. a single MSP pulse is applied to the clock input terminal of the counter 216. The relay 354 is simultaneously deenergized and the AND gates 350, 352 are enabled. The wrap roll control unit is thereafter operable as described in connection with FIG. 3.

It can thus be seen that the manual override circuit provides a convenient calibration for the wrap roll control unit. At the end of a manual override cycle as described above, the wrap roll is at the position corresponding to 90 f.p.m. corrugator speed and a count corresponding to 90 f.p.m. is stored by the memory counter. It will, of course, be appreciated that a maximum wrap position and a count of 16 may be utilized as the calibration point. Moreover, the sensing of maximum wrap position may automatically initiate the above described calibration of the unit in addition to the manual switch 342.

The present invention may thus be embodied in other specific forms without departing from the spirit or essential characteristics thereof. The presently disclosed embodiments are therefore to be considered in all respects as illustrative and not restrictive, the scope of the invention being indicated by the sppended claims rather than by the foregoing description, and all changes which come within the meaning and range of equivalency of the claims are therefore intended to be embraced therein.

What is claimed is:

1. In a corrugating machine for the production of double-face corrugated paperboard by joining a flat paper web to one side of a corrugated medium to form a single-face web and joining a second flat paper web to the opposite side of the corrugated medium to form the double-face corrugated paperboard, apparatus for heating the webs as a function of only one production factor of the corrugator machine and without a feedback signal comprising:

- at least one rotatably journaled heating roll for receiving a web in contact with a circumferential area of the roll;
- means positionable relative to the heating roll for varying the circumferential area of contact between the web and the roll; and,
- control circuit means for positioning the positionable means relative to the heating roll in response to only one production factor of the corrugating machine, said control circuit means comprising:
  - means for sensing said one production factor of the machine and for generating a signal related to said sensed production factor;
  - means for periodically sampling said generated production factor related signal;
  - means for storing the sampled production factor related signal at a first time;
  - means for comparing said stored production factor related signal with said production factor related signal sampled at a time subsequent to said first time;
  - means responsive to said comparing means for generating a drive signal related in value to a difference between the compared signals; and,
  - drive means for driving the positionable means in response to said generated drive signal.

2. The apparatus of claim 1 wherein said production sensing means comprises means for generating a series of pulses related in repetition rate to the one production factor of the corrugating machine, and wherein said production factor related signal sampling means comprises means for periodically counting the pulses in said series of pulses for a predetermined time interval to produce a count signal related to the one production factor.

3. The apparatus of claim 2 wherein said storing means comprises digital circuit means for storing said count signal, said comparing means comprising means for determining the relative magnitudes of said stored count signal and said count signal sampled subsequent to said stored count signal.

4. The apparatus of claim 3 wherein said pulse generating means comprises means for generating a series of pulses related in frequency to the speed of the corrugating machine.

5. The apparatus of claim 1 wherein said production factor sensing means comprises means for sensing the production speed of the corrugating machine.

6. The apparatus of claim 5 wherein said production factor sensing means comprises means for generating a series of pulses related in repetition rate to the speed of the corrugating machine, and wherein said production factor related signal sampling means comprises means for periodically counting the pulses in said series of pulses for a predetermined time interval to produce a count signal related in value to the speed of the corrugating machine.

7. The apparatus of claim 1 wherein said drive means comprises a bidirectional a.c. induction motor and wherein said drive signal generating means comprises means for generating a drive signal related in duration to the difference between said compared signals.

8. The apparatus of claim 7 wherein said drive signal generating means includes means responsive to said comparing means for applying said drive signal to said motor to drive said motor in a direction tending to equalize the difference between said compared signals.

9. The apparatus of claim 8 wherein said production factor sensing means comprises means for sensing the production speed of the corrugating machine.

10. The apparatus of claim 9 wherein said production factor sensing means comprises means for generating a series of pulses related in repetition rate to the speed of the corrugating machine, and wherein said production factor related signal sampling means comprises means for periodically counting the pulses in said series of pulses for a predetermined time interval to produce a count signal related in value to speed of the corrugating machine.

11. The apparatus of claim 7 wherein said production factor sensing means comprises means for sensing the production speed of the corrugating machine.

12. The apparatus of claim 1 including means for inhibiting at least the storing of said sampled production factor related signal by said storing means and the driving of said drive means by said drive signal;

means for generating a second drive signal and applying said second drive signal to said drive means to drive said positionable means to a predetermined location; and means for storing a signal having a predetermined value in said storing means in response to said positionable means reaching said predetermined location.

13. A method for heating webs in a corrugating machine for the production of double-face corrugated paperboard as a function of only one production factor of the corrugating machine, and without a feedback signal, the method comprising the steps of:

providing a rotatably journaled heating roll for receiving a web in contact with a circumferential area of the roll; and, positioning a positionable means relative to the heating roll in response to the one production factor of the corrugating machine to vary the circumferential area of the contact between the web and the roll by:

sensing the one production factor of the machine and generating a signal related to the sensed production factor;

periodically sampling the generated production factor related signal;

storing the sampled production factor related signal at a first time;

comparing the stored production factor related signal with the production factor related signal sampled at a time subsequent to the first time;

generating a drive signal related in value to a difference between the compared signals; and, driving the positionable means in response to the drive signal.

14. The method of claim 13 wherein the sensed production factor is the speed of the corrugating machine.

* * * * *

UNITED STATES PATENT AND TRADEMARK OFFICE

CERTIFICATE OF CORRECTION

PATENT NO. : 4,056,417

DATED : November 1, 1977

INVENTOR(S) : JOHN S. LEAGUE, IV

It is certified that error appears in the above-identified patent and that said Letters Patent are hereby corrected as shown below:

Claim 2, Line 1 After "production" insert --factor--

Signed and Sealed this

*Twenty-first* Day of *March 1978*

[SEAL]

*Attest:*

RUTH C. MASON
*Attesting Officer*

LUTRELLE F. PARKER
*Acting Commissioner of Patents and Trademarks*